April 8, 1969
C. A. LINDLEY
3,437,286
SPACE VEHICLE SPIN CONTROL
Filed Oct. 12, 1966
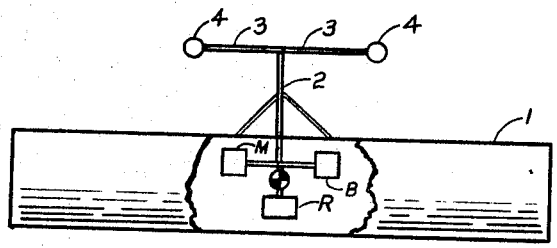
FIG. 1
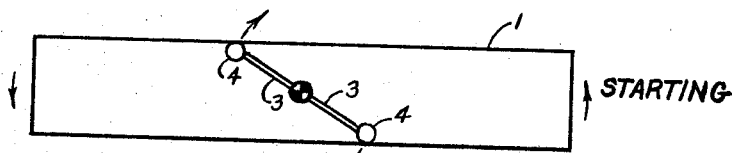
FIG. 2A  STARTING
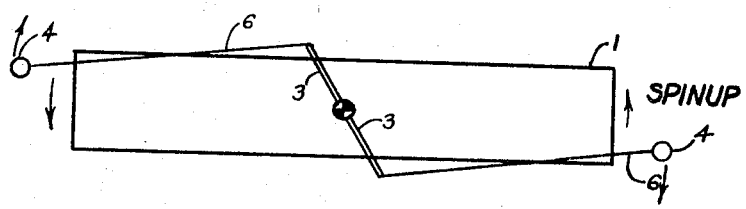
FIG. 2B  SPINUP
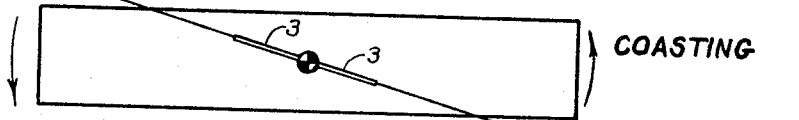
FIG. 2C  COASTING
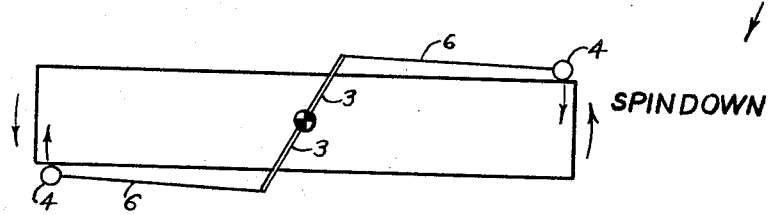
FIG. 2D  SPINDOWN
Charles A. Lindley
INVENTOR April 8, 1969    C. A. LINDLEY    3,437,286
SPACE VEHICLE SPIN CONTROL
Filed Oct. 12, 1966    Sheet 2 of 2

Charles A. Lindley
INVENTOR

United States Patent Office 3,437,286
Patented Apr. 8, 1969

3,437,286
SPACE VEHICLE SPIN CONTROL
Charles A. Lindley, 18900 Pasadero Drive,
Tarzana, Calif. 91356
Filed Oct. 12, 1966, Ser. No. 586,163
Int. Cl. B64c 5/00
U.S. Cl. 244—1
6 Claims

ABSTRACT OF THE DISCLOSURE

Artificial gravity on a manned space vehicle is selectively provided by spinning the vehicle about its center of gravity. A series of weights rotatable about an axis intersecting the vehicle center of gravity is spun up and its inertial reaction is applied to vehicle to cause it to spin in the opposite direction. Each weight is attached to a cable which is reeled out to increase the moment of inertia of the rotating weight system. The space vehicle is despun by braking the rotary weight system and simultaneously reeling in the weights to their stored position.

---

It is generally recognized that artificial gravity will have to be provided before men can safely and comfortably endure the weightless environment of space flight for long periods of time. One of the purposes of this invention is to provide such artificial gravity by rotation of the space vehicle at a very small total design penalty in installed weight, power and propellant consumption. Another purpose of this invention is to provide a means for rapid attitude changes including spin and despin in unmanned satellites. Other purposes are described below.

Artificial gravity devices previously proposed for manned orbiting space vehicles may be broken down into two classifications; the personnel centrifuge and the full-vehicle artificial gravity system. The full-vehicle artificial gravity system could potentially have less interference with the useful work of the vehicle personnel. Such activities as personal hygiene, sleeping, exercise, clerical work and certain forms of communications, maintenance, and experimental work can be carried on as well or better in a full-vehicle artificial gravity field. But full-vehicle rotation would interfere severely with certain other space experiments and operations such as observation, zero $g$ studies, space navigational sightings, rendezvous and docking.

If it were possible to stop and start full-vehicle rotation rapidly and frequently one could work out a satisfactory schedule of "gravity-on" and "gravity-off" time that would allow almost any likely set of experiments, operational activities, and personal activities and still give the crew a reasonable fraction of their time under artificial gravity to sustain cardiovascular conditioning. Unfortunately, in all full-vehicle artificial gravity systems previously proposed, the rotation was started and stopped by the expenditure of rocket propellant and the total amount of propellant expended was so high as to preclude more than one or a very few starts and stops. This made the scheduling of repetitive "gravity-on" and "gravity-off" time for a practical operating schedule very restrictive if not completely impractical.

In the individual centrifuge systems, one or more individuals obtain their "$g$" therapy time by riding the centrifuge, which removes them from their crew stations and gives little or no opportunity for concurrent useful work or sleep. The therapy time is thus subtracted from the total mission manhours available. Space manhours are too valuable to waste in this way unless absolutely necessary, so the artificial gravity system is likely to be run only the minimum amount of time required for health and safety or to be relegated to the position of a back-up device to be installed only if absolutely needed. The individual centrifuge would not be considered if a full-vehicle system could be started and stopped frequently and quickly at a reasonable total weight penalty. This invention provides a device with these attributes.

It is possible to rotate a full vehicle without expenditure of rocket propellant by use of a large flywheel. A flywheel attached by a shaft to the vehicle is spun up by electrical or mechanical power. The inertial reaction of the flywheel under angular acceleration causes the vehicle to spin-up in the opposite direction with the same angular momentum.

The use of a flywheel would be quite attractive if the weight and power penalties were reasonable and the unit could be compactly installed. However, the angular momentum of the flywheel must equal that of the vehicle, while the flywheel rim speed is limited to about 1,000 feet per second by the rotational stresses. Subject to these limitations, a flywheel adequate for rotation of a vehicle at the required speed for artificial gravity effect and small enough for internal installation in the vehicle may require 5 to 10 percent of the vehicle weight in the flywheel rim weight alone. Also, the kinetic energy of the flywheel may be upwards of 100 times the kinetic energy of the rotating vehicle alone. These installed weight and power requirements are excessive and preclude the use of the conventional flywheel.

Analysis of the appropriate equations shows that both the required flywheel rim weight and the wheel kinetic energy vary inversely with the flywheel radius. Thus, a flywheel with a radius of several hundred feet would have very acceptable rim weight and power requirements.

The invention herein disclosed as a unique and valuable solution to this problem is a lightweight deployable rotary inertia system with a variable radius and which can be accelerated and decelerated. Mechanically, it is the equivalent of a variable radius flywheel. Numerous mechanizations are possible for the deployable inertia system. The general requirements are an acceptable launch package configuration capable of extension to place one or more weights at a large radius in a configuration capable of sustaining torque for angular acceleration and deceleration. For example, two or more telescoping tubes or "De Havilland Booms" with weights at the ends and a driven central shaft would make a rigidly deployable inertia system of moderate radius, acceptable as an attitude control reaction wheel or spin-despin device for unmanned satellites.

Another version of the deployable inertia system herein disclosed is more appropriate for artificial gravity rotation of a large manned space station. This device is based upon two or more weights whirled at the ends of long, light flexible cables by the mechanical action of central crank arms.

The foregoing objects of the invention and the above forms of the invention will be better understood from the following description taken in conjunction with the drawings in which:

FIGURE 1 is a diagrammatic side view of the invention.

FIGURES 2A, 2B, 2C and 2D are diagrammatic top views showing the invention in its different functional positions.

Figure 3:
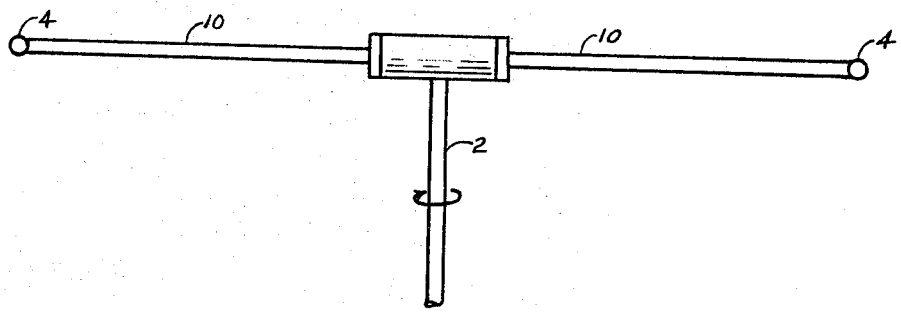
FIGURE 3 is a side view of a modified form of the deployable inertia system of the invention.

Referring now to FIGURES 1 and 2, there is shown a space capsule or vehicle 1 having its center of gravity at the point indicated. Journaled to or within vehicle 1 is a main shaft 2 having an axis of rotation passing through the center of gravity of vehicle 1. The axis of rotation of shaft 2 is also normal to the plane in which vehicle 1 is to be rotated to produce the desired artificial gravity for its inhabitants. Crank arms 3, 3 are affixed perpendicularly to the outer end of shaft 2 and are of equal length and aligned with each other. Preferably within vehicle 1 are motor M and brake B, each being mechanically coupled through conventional gear boxes, or the like, to respectively drive and retard the main shaft in relative rotation with respect to vehicle 1.

At the end of each of the crank arms 3 is a weight member 4 whose mass is determined as a function of vehicle mass, maximum relative rotational speed of shaft 2 and the maximum distance they are to be deployed from shaft 2. Weight members 4 are each attached to flexible strands or cables 6. Cables 6 are fed out so as to permit weight 4 to move out centrifugally so as to increase the moment of inertia of the assembly about the axis of shaft 2. Cables 6 are also retractable to move the weights 4 to their stowage position (FIGURE 2A).

By way of example, cables 6 may be played out and retracted by being rigged through crank arms 3, shaft 2 and onto reel R which is mounted on and rotates with shaft 2. A reversible motor (not shown) drives reel R selectively in either direction.

In operation the small secondary counterweights 4, shown in FIGURES 1 and 2, are initially drawn up by their cables 6 against the ends of the cranks 3 for safety and positive positioning. A light driving torque is applied to the crank arms 3 which begin to rotate in one direction while the reaction torque rotates the space station 1 slowly in the opposite direction as shown by the arrows in FIGURE 2. When the centrifugal force on the weights 4 reaches a prescribed value, the cables 6 are allowed to gradually reel to the positions shown in FIGURE 2B. The driving torque is brought gradually to the maximum allowable value and the crank arms 3 lead the secondary counterweights 4, continuing their acceleration. The vehicle 1 continues to accelerate in the opposite rotation. When the vehicle 1 reaches the desired rotational speed, torque to the crank arms 3 is discontinued and the crank arms 3, secondary counterweights 4 and cables 6 coast in the configuration shown in FIGURE 2C. Spin-down is accomplished by braking the crank arms 3 with the counterweight cables 6 being reeled in slowly to maintain tension. Braking of the crank arms 3 causes them to lag the weights 4 and cables 6, assuming the configuration shown in FIGURE 2D during deceleration. Braking continues until the weights 4 are again pulled up to the ends of the crank arm 3 and the whole system is stopped. Power for reeling in can be obtained from the braking action, if desired.

Estimates have been made of the weight of the inertia system and mechanism required to rotate a typical manned space station rapidly enough to simulate earth normal gravity. The total weight of the inertia system mechanism, drive motor and brakes was less than one tenth of one percent of the total station weight. The total energy requirement was about one kilowatt hour of energy for every 100 tons of station weight for every spin-up and stop cycle.

There is a possible problem in the deployable inertia system mechanism just described, in that the smooth rotation of the inertia system might be disturbed by such forces as motions of the astronauts inside the station, shifting the station's center of gravity, or by attempts of the station to do low thrust maneuvers or attitude changes. A version of the deployable inertia system can be designed which is structurally stabilized against moderate disturbing forces in all directions while rotating. In addition, this version can be designed for checkout operation on the ground under normal gravitational acceleration.

A form of this invention shown in FIGURE 3 achieves this stabilization. This form employs two extensible booms 10 with a counterweight 4 secured to the end of each boom 10. A typical boom construction suitable for use in the invention is the "De Havilland Boom" which is well known in the art. These booms 10 are extended and retracted by conventional means which have been omitted from the drawings since, per se, they are not part of the present invention. This form of the invention may be cycled in the same manner as the device of FIGURE 1 to achieve vehicle spin-up and spin-down.

Figure 4:
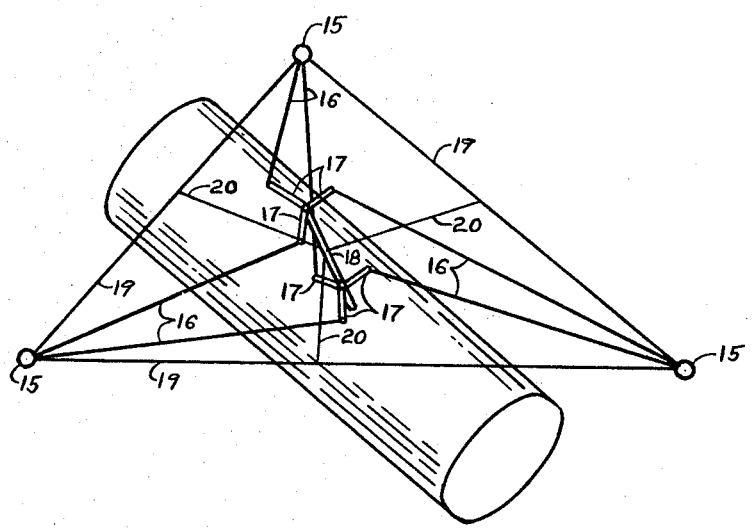
FIGURE 4 is a diagrammatic perspective view of still another form of the invention.

Another form of the invention is shown in FIGURE 4 in the fully deployed configuration. The basic inertia system consists of three weights 15, each restrained by two nearly radial lines 16 of equal length attached to identical crank-arms 17, spaced some distance apart along the drive shaft 18. When the deployable inertia system is rotating, the two nearly radial lines 16 form an isosceles triangle, which stabilizes the weights 15 against motions out of the plane of rotation.

A perimeter line 19 connecting the three weights 15 in an equilateral triangle serves to stabilize the weights 15 against disturbances that would change their phase relationship in rotation, so long the the system is fully deployed and the perimeter line 19 is under light tension. This prevents oscillations in which one weight 15 would try to overtake another. Thus, the geometry of the inertia system is fully stabilized so long as it is fully extended and rotating. The degree of stability and damping are functions of the line angles, the crank 17 spacing on the center shaft 18, and the elastic and damping properties of the cables.

Let us now examine the deployment and retraction scheme, and the stability during transition. A set of light lines 20 connect the centers of the perimeter lines with conventional reels (not shown) in the center shaft 18. The operation will be described starting in the deployed and rotating condition. Deceleration is begun by lightly braking the center shaft 18, so that the crank arms 17 lag the weight rotation, and the weights 15 begin to decelerate. At the same time, the light lines 20, leading to the perimeter lines 19 are taken in enough to pull the perimeter lines 19 tight, despite the foreshortening of the radial lines 16 by the lagging crank-arms 17. This keeps the weights 15, fully stabilized. The control of the cable reel system, which is mounted for rotation with shaft 18, maintains a very light tension on the cables throughout the operating cycles.

As the deceleration continues, reels (not shown) in the crank mechanism begin to take in all the near-radial lines 16 at an equal rate, gradually decreasing the flywheel radius. The light lines 20 leading to the perimeter lines 19 continue to reel in, maintaining a light tension in the perimeter line 19, so that the inertia system remains fully stabilized until the perimeter lines 19 reach the center shaft 18. At this point, the two halves of the perimeter line 19 are pulled onto the reel. Reeling in of all lines continues, but the positive stabilization in phase relation of the weights 15 is lost, because the perimeter lines 19 are now radial. However, stabilization against out-of-plane movements of the weights 15 continues as the weights 15 are further decelerated and reeled in. The perimeter lines 19 also are reeled in under a tension just great enough to leave no slack for fouling. At the end of the process, the weights 15 are pulled up tight between pairs of crank arms 17, or they may be pulled down and positively secured to the center shaft 18 by a final pull on the perimeter lines 19.

The deployment procedure is the reverse of that just described, and is initiated by applying a torque to the center shaft 18, causing the whipping action to start, and reeling out the near-radial lines 16 at a controlled rate, while maintaining a very light tension on the perimeter line complex 19. As in the retraction, the inertia system is stabilized against out-of-plane motion only, until the light lines 20 follow the perimeter lines 19 off the center reels. Thereafter the inertia system is stabilized against disturbances in all directions.

I claim:

1. A system for imparting spin to a space vehicle comprising:
   a main body having an axis of rotation;
   a variable radius inertia system rotatable about an axis substantially coincident with the axis of rotation of the vehicle body, said system including a plurality of weight members symmetrically spaced about the axis of the inertia system;
   extensible and retractable means attached to each of said weight members controlling their displacement from the axis of the inertia system;
   means for accelerating said inertia system in rotation about its axis and transmitting a counter torque to the main vehicle body whereby said body is rotated about its axis;
   means for decelerating said inertia system and simultaneously decelerating said vehicle body;
   means operating said extensible and retractable means to increase and decrease the moment of inertia of the inertia system about its axis of rotation.

2. A system as defined in claim 1 wherein the extensible and retractable means comprises flexible strands, and the operating means includes at least one reel for the strands, said reel being driven by a reversible motor.

3. A system as defined in claim 1 wherein each extensible and retractable means constitutes a rigid boom when extended.

4. A system as defined in claim 2 wherein each weight member is constrained to rotate about the axis of the inertia system by two strands constituting the sides of an approximate isosceles triangle with axis of the inertia system as its base to constrain the weights to planar motion.

5. The system as defined in claim 2 wherein means interconnect the weight members retaining them in angular spaced apart relation.

6. The system as defined in claim 4 wherein means interconnect the weight members retaining them in angular spaced apart relation.

References Cited

UNITED STATES PATENTS

| | | | |
|---|---|---|---|
| 3,235,204 | 2/1966 | Lee | 244—1 X |
| 3,277,486 | 10/1966 | Kuebler | 244—1 X |
| 3,333,788 | 8/1967 | Dryden | 244—1 |

FERGUS S. MIDDLETON, *Primary Examiner.*

U.S. Cl. X.R.

244—3.21